UNITED STATES PATENT OFFICE.

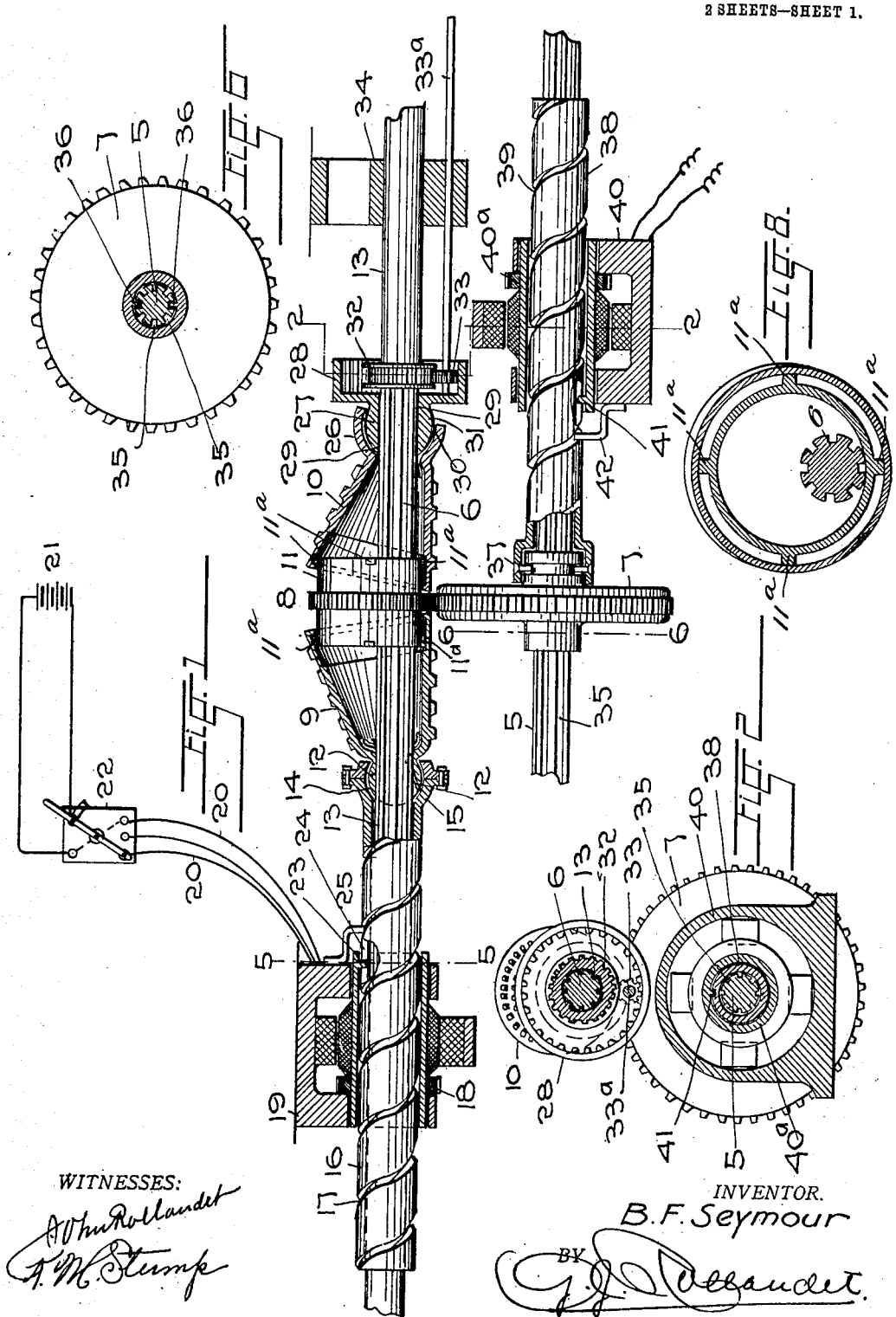

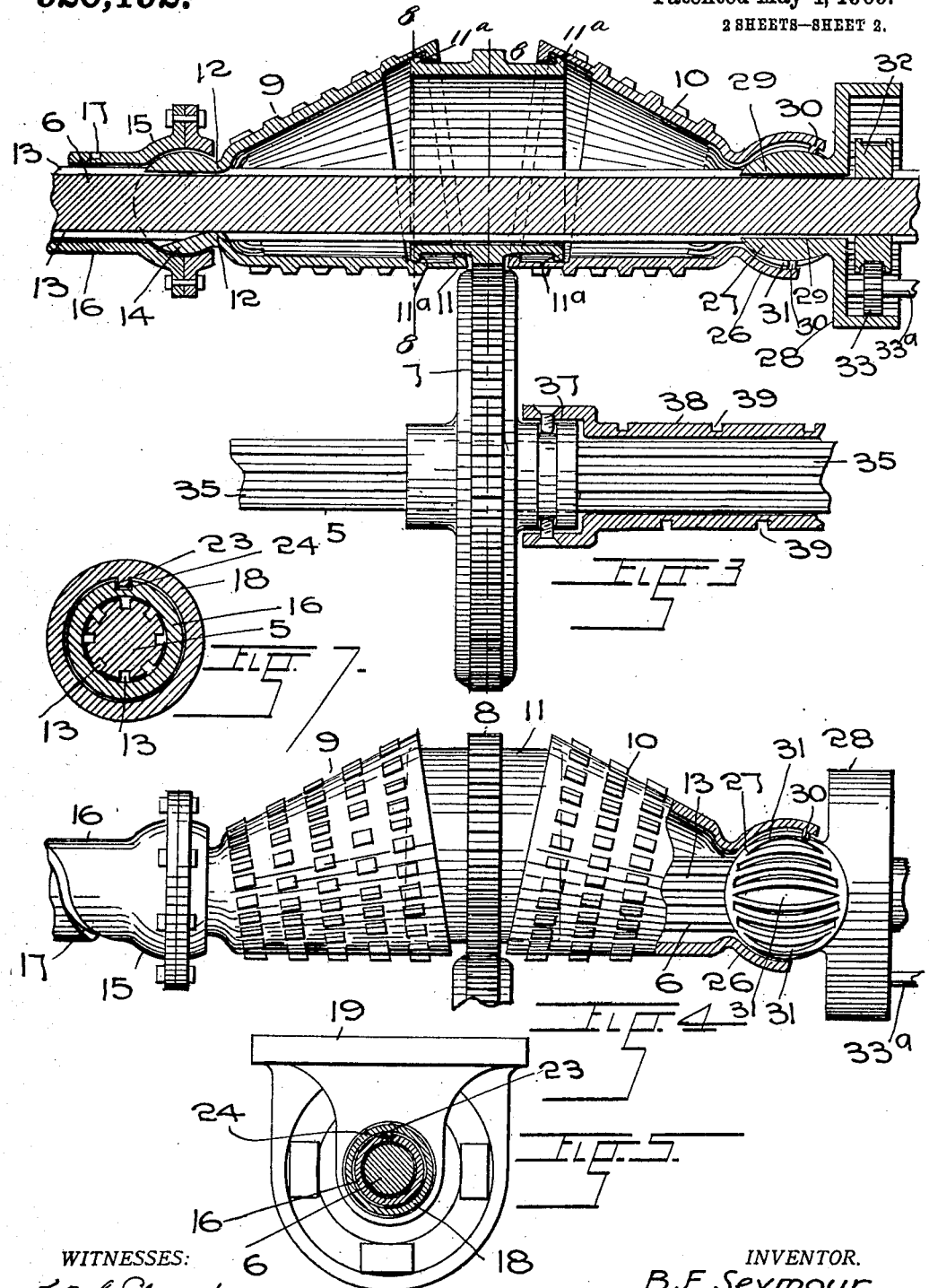

BENJAMIN F. SEYMOUR, OF DENVER, COLORADO.

TRANSMISSION MECHANISM.

No. 920,192.　　　　Specification of Letters Patent.　　　　Patented May 4, 1909.

Application filed May 9, 1908. Serial No. 431,966.

*To all whom it may concern:*

Be it known that I, BENJAMIN F. SEYMOUR, a citizen of the United States of America, residing at Denver, in the county of Denver and State of Colorado, have invented certain new and useful Improvements in Transmission Mechanism, of which the following is a specification.

This invention relates to certain new and useful improvements in power transmission mechanism and its object is to provide a device by the use of which the speed of a driven shaft, in relation to the substantially constant velocity of a driving element, can be varied at will within certain limits, and by means of which the said driven shaft may be held against rotation, or its direction of rotation be reversed, while the driving element continues its rotary movement in one direction.

My improved mechanism which combines simplicity of construction with thorough practicability in use, is of peculiar value for use on vessels, air ships and other contrivances where it is of advantage to control the movements of a driven shaft from a remote point.

I attain my objects by the mechanism illustrated in the accompanying drawings in the various views of which like parts are similarly designated and in which—

Figure 1— represents a side elevation of the device, partly in section, in connection with two horizontally mounted shafts, Fig. 2— a transverse section taken along a line 2—2, Fig. 1, Fig. 3— an enlarged longitudinal section, partly in elevation, of the shafts and the transmission members associated therewith, Fig. 4— an elevation, partly in section, of the transmission members upon the driven shaft, Fig. 5— a transverse section taken along a line 5—5, Fig. 1, Fig. 6— a section taken along a line 6—6, Fig. 1, Fig. 7— an enlarged sectional view through the driven shaft, the surrounding sleeve and the therewith associated motor-armature, and Fig. 8 a section taken along a line 8—8, Fig. 3.

Referring to the drawings, let the reference character 5 designate the driving shaft and 6 the driven shaft of a mechanism to which my improved transmission means are applied, 7 a gear wheel mounted upon the shaft 5 and 8 the therewith operatively engaging element, carried upon the shaft 6, by means of which the rotary movement of the driving shaft in one direction, may be transposed into a rotative motion of the other in either direction and at varying rates of speed.
In this connection I wish it understood that, although in the following description and claims the shafts 5 and 6 and the therewith associated parts, have been termed respectively the driving and driven elements, this relation may be reversed and the power applied to the shaft 6 and transmitted to the shaft 5.

The element 8 of my invention comprises two hollow, conoidal members 9 and 10 which surround the shaft 6 in reverse relation to each other and whose largest, open extremities bear upon an idle, hollow wheel 11 which likewise surrounds the shaft 6 and is adapted to engage the peripheral teeth on the driving wheel 7, when the parts are in their central position and the driven shaft is at rest (see Fig. 1 of the drawings). The idle wheel 11 is provided with outwardly extending pins 11$^a$ which project into annular grooves in the interior of the two conoidal members so that, while the said members may gyrate independently about an axis common with that of the shaft, they will move longitudinally in unison.

The member 9 of the element 8 terminates at its opposite end in a spherical extension 14 which has a central conical opening through which the shaft extends and which is formed with a plurality of teeth 12 adapted to engage equidistant, longitudinal grooves 13 in the peripheral surface of the shaft for the purpose of transmitting the rotary movement of the one to the other. The spherical portion 14 of the conoidal member 9 is inclosed in a correspondingly shaped socket 15 which constitutes the extremity of a sleeve 16 which loosely surrounds the driven shaft 16 and which is formed with a peripheral spiral groove 17.

The sleeve 16 extends through a hollow core 18 of the armature of an electro motor 19, the conductors 20 of which may be connected with a suitable source of electricity 21 through means of an interposed circuit switch 22. The core 18 has an inwardly extending lug 23 which, projecting into a longitudinal groove 24 in the sleeve 16, compels the two parts to rotate in unison while permitting an independent longitudinal movement of the surrounding sleeve, the said movement being imparted thereto, while the armature is in motion by means of a detent 25, which being rigidly secured to the field frame of the motor, projects into the spiral groove 17. The extremity of the opposite conoidal member 10 of the element 8 is formed with a globular socket 26 which surrounds the correspondingly formed hub 27 of an internal gear wheel 28 which is mounted upon the shaft 6 to rotate in unison therewith, while being longitudinally movable thereon, by means of teeth 29 which, extending inwardly from the surface of the bore in the spherical hub 27, engage the before named longitudinal grooves 13 of the shaft 6.

The socketed extremity of the member 10 is formed with inwardly projecting teeth 30 which mesh with polar ridges 31 formed equidistantly upon the peripheral surface of the hub 27 of the internal gear 28, to transmit to the latter the rotary movement of the conoidal member 10. The two members 9 and 10 have upon their peripheral surfaces, a plurality of consecutively arranged, equidistant series of teeth of even pitch which are adapted to mesh with the corresponding teeth of the driving member 7 and the above described method of connecting the said member with the sleeve 16 and the internal gear wheel 28, permits them to rotate about their own imaginary axes and to gyrate about the shaft as a center. Mounted upon the shaft 13, within the internal gear 28 is a flanged spur-wheel 32, formed in its bore, with radial teeth which project into the longitudinal grooves 13 of the shaft to compel the latter to rotate with the gear, while allowing a longitudinal adjustment thereof. An intermediate gear 33 which meshes with both the internal gear 28 and the spur wheel 32, is mounted upon a shaft 33ᵃ which is longitudinally-movably supported in a bearing 34. It will thus be seen that, when, by engagement of the driving wheel 7 the conoidal member 10 is actuated, the latter's rotary movement is by means of the engaging teeth 30 and ridges 31, transmitted to the gear 28, thence, through instrumentality of the gear 33, to the spur wheel 32, which, in consequence imparts a rotary motion, in opposite direction from that of the member 10, to the shaft 6.

The driving shaft 5 has a plurality of longitudinal grooves 35 for the reception of splines 36 on the gear wheel 7, which thereby is slidably connected therewith, and the said wheel 7 is connected by means of a swivel joint 37 with the extremity of a sleeve 38 which surrounds the shaft 5 and, like the sleeve 16 on the driven shaft, is provided with a peripheral spiral groove 39.

An electro motor 40, whose armature 40ᵃ surrounds the sleeve, is arranged in an identical manner, and for the same purpose, as the motor 19 which actuates the sleeve 16, the armature having a pin 41 which projects into a longitudinal groove in the sleeve 38, and the field frame having a detent 42 which engages the peripheral groove 39.

In the operation of the device, power is applied to the driving shaft in any suitable manner and the consequent rotary movement of the driving gear 7 is transmitted to the driven shaft through the instrumentality of the element 8. While the latter is in its central position and the idle wheel 11 engages the gear 7, the shaft 6 will remain at rest until, by manipulation of the circuit switch 22, the motor 19 is energized and a longitudinal movement is imparted to the therewith associated sleeve 16 to bring one or the other of the conoidal gears 9 and 10 into mesh with the wheel 7. The movement of the sleeve is the direct result of the rotative motion of the armature 18 with which it moves in unison by means of the projection 23, which engages the longitudinal groove 24, while the detent 25 on the field frame, which projects into the spiral groove 17, impels the sleeve longitudinally in a direction relative to the direction of rotation of the armature. When the gear 7 is in engagement with the peripheral teeth of the conoidal member 9, it causes the latter to gyrate about the shaft 6 as a center while it revolves around its own imaginary axis, which movement is transmitted to the driven shaft 6 by the engagement of the teeth 12 on the one, with the grooves 13 on the other, the gear being normally held against longitudinal displacement by the detent 25 which projects into its peripheral groove 17. To reverse the direction of rotation of the shaft 6, the conoidal member 10 is, in like manner, brought in engagement with the gear 7 and its resultant rotary motion imparted, by means of the teeth 30ᵃ and the ridges 31, to the internal gear 28, whose movement is, through instrumentality of the gear 33 and the spur wheel 32, transposed into a rotary movement of the shaft 6 in opposite direction. As the diameter of each series of peripheral teeth on the conoidal members 9 and 10, differs from that of the preceding one, the speed of the shaft 6 may be varied at will by adjustment of the sleeve 16 which brings the driving gear 7 in mesh with any one of the various series on the two members. The same results may be obtained by moving the driving gear 7 along the shaft 5, which, as hereinbefore described, is accomplished by energization of the motor 40, or in case it is desired to change the movement of the driven shaft with great rapidity, both the element 8 and the driving gear 7 may be moved simultaneously.

Having thus described my invention what I claim is:—

1. The combination with a driving element and a driven shaft, of a hollow conoidal transmission member, longitudinally adjustably mounted upon the latter and free to gyrate about the axis thereof, in engagement with the said element, and electrical means to propel the said member along the said shaft and to hold it at a selected point within predetermined limits.

2. The combination with a driving element, of a driven shaft, a sleeve encircling the latter, a conoidal transmission member in coactive engagement with the shaft, connected with the said sleeve and free to gyrate about an axis common with that of the shaft, by engagement with the said element, and electrical means adapted to move the sleeve longitudinally in relation to the shaft and to secure it at a selected point within predetermined limits.

3. The combination with a driving element, of a driven shaft, a sleeve encircling the latter, a conoidal transmission member in coactive engagement with the shaft, connected with the said sleeve and free to gyrate about an axis common with that of the shaft, by engagement with the said element, an electro motor, whose armature surrounds the said sleeve and has a projection engaging a longitudinal groove therein, and a stationary detent projecting into a peripheral, spiral groove in the said sleeve.

4. The combination with a driving and a driven shaft, of a hollow conoidal transmission member in coactive engagement with the latter and free to gyrate about the axis thereof, a driving element in engagement with the transmission member, mounted to rotate with the driving shaft and to be moved longitudinally in relation thereto, and suitable means to propel the said driving element along the said shaft and to secure it thereto at a selected point within pre-determined limits.

5. The combination with a driving and a driven shaft, of a hollow conoidal transmission member in coactive engagement with the latter and free to gyrate about the axis thereof, a sleeve encircling the driving shaft, a driving element engaging the said transmission member, mounted to rotate with the driving shaft and movably connected with the sleeve, and suitable means adapted to move the said sleeve along the said shaft and to secure it at any selected point within predetermined limits.

6. The combination with a driving and a driven shaft, of a hollow, conoidal transmission member in coactive engagement with the latter and free to gyrate about the axis thereof, a sleeve encircling the driving shaft, a driving element engaging the said transmission member, mounted to rotate with the driving shaft and movably connected with the sleeve, an electro motor whose armature surrounds the said sleeve and has a projection engaging a longitudinal groove therein, and a stationary detent projecting into a peripheral, spiral groove in the said sleeve.

7. The combination with a driving element of a driven shaft, a hollow, conoidal transmission member longitudinally-adjustably mounted upon the latter and having a gyratory movement about the axis thereof and means to transpose the rotary movement of the said transmission member into a rotative motion of the shaft in opposite direction.

8. The combination with a driving element of a driven shaft, a hollow, conoidal transmission member longitudinally adjustably mounted upon the latter and having a gyratory movement about the axis thereof, an internal gear in coactive engagement with the said transmission member, a spur wheel mounted upon the said shaft and a gear wheel in coöperative engagement with the said internal gear and spur wheel.

9. The combination with a driving element and a driven shaft, of two hollow conoidal transmission members having a coöperative longitudinal adjustment on the latter and mounted to gyrate independently about the axis thereof, and means to transpose the gyratory movement of one of the said members into a rotative motion of the shaft in opposite direction, the other member and the shaft having coöperative means whereby they rotate in unison.

10. The combination with a driving element and a driven shaft of two hollow conoidal transmission members mounted upon the latter to gyrate independently about the axis thereof, an interposed idle wheel connecting the said members, means to move the said members longitudinally along the said shaft and to secure them at any selected point within predetermined limits, means to transpose the gyratory movement of one of the said members into a rotative movement of the shaft in opposite direction, the other element and the shaft having coöperative means whereby they rotate in unison.

11. The combination with a driving shaft and a driven shaft of a transmission element upon the latter, comprising two hollow conoidal members adapted to gyrate independently about an axis common with that of the shaft, one of the said members and the said shaft having coöperative means whereby they rotate in unison, means to transpose the gyratory movement of the other member into a rotary motion of the shaft in opposite direction, a driving member mounted to rotate with the driving shaft, and adapted to coöperatively engage the members of the transmission element and means to move the said element longitudinally with respect to its shaft and to secure it at a selected point within predetermined limits.

12. The combination with a driving shaft and a driven shaft, of a transmission element upon the latter, comprising two hollow conoidal members adapted to gyrate independently about an axis common with that of the shaft, one of the said members and the said shaft having coöperative means whereby they rotate in unison, means to transpose the gyratory movement of the other member into a rotary motion of the shaft in opposite direction, means to move the said element longitudinally and to secure it at a selected point within predetermined limits, a driving member mounted to rotate with the driving shaft and adapted to coöperatively engage the members of the transmission element and means to move the said element longitudinally with respect to its shaft and to secure it at a selected point within predetermined limits.

In testimony whereof I have affixed my signature in presence of two witnesses.

BENJAMIN F. SEYMOUR.

Witnesses:
G. J. ROLLANDET,
K. M. STUMP.